June 29, 1926.  
C. A. BRYANT  
CONVEYER BELT  
Filed June 19, 1925

1,590,884

WITNESSES

INVENTOR  
CYRUS A. BRYANT  
BY  
ATTORNEYS

Patented June 29, 1926.

1,590,884

UNITED STATES PATENT OFFICE.

CYRUS A. BRYANT, OF PASSAIC, NEW JERSEY.

CONVEYER BELT.

Application filed June 19, 1925. Serial No. 38,249.

My invention relates to a conveyer belt and particularly to the cleats thereof. The cleats in general use are of four types, the first being made about one-quarter of an inch high and formed of narrow strips of rubber belting or similar material fastened by staples across the belt at intervals, about one foot, said cleats being used where the conveyer is to be employed for conveying fine coal, ashes, sand, and like fine material. The second type is known as high cleats and used where large sizes of coal and like material are handled, which material has a tendency to roll back down the belt, the tendency being especially marked with the larger lumps of the material being conveyed and the tendency referred to reduces the capacity of the conveyer materially. The so-called high cleats referred to are formed by bending a broad piece of the material of which the rubber belting is formed to give it an arched form about one and one-half inches high, the bent and arched material being fastened across the belt at intervals about one and one-quarter feet, clinched staples being usually employed for fastening. A third form of cleat consists of the cross pieces of angle iron about one and one-quarter inches high in practice and fastened in position across the belt through the medium of one-quarter inch elevator bolts. In a fourth form of cleat, angle irons are employed as above referred to, but reinforced or supplemented by bolting thereto strips of the rubber belting material so that the strips project above the edges of the angle irons for about one-half inch. The defects characterizing the use of the three high cleats above referred to are as follows:

In the second one the arched material having a rounded form initially is frequently wetted and in the weighted form it becomes flappy and flattens down, failing to carry up the large lumps. A defect also is that the cleat wears out very quickly. In the use of angle irons many holes must be punched in the belt to receive the elevator bolts, thereby weakening the structure of the belt and causing it to quickly wear out as the puncturing of holes cuts off the threads of the cotton fabric used in the manufacture of the belt. These objections apply to the last-mentioned type of cleat and besides there is an increased expense with no appreciable benefit, as the raw edges of the belting material entering into the cleat very quickly shred away and wear down to the irons.

The general object of my invention is to provide a cleat that will overcome the objections recited above and will be particularly effective in retaining the load increment carried thereby and in a manner to prevent or to minimize any tendency of the material to roll back.

The nature of my invention and its distinguishing features and advantages will clearly appear as the description proceeds.

Reference is to be had to the accompanying drawings forming a part of this specification, it being understood that the drawings are merely illustrative of practical examples of the invention.

Figure 1:
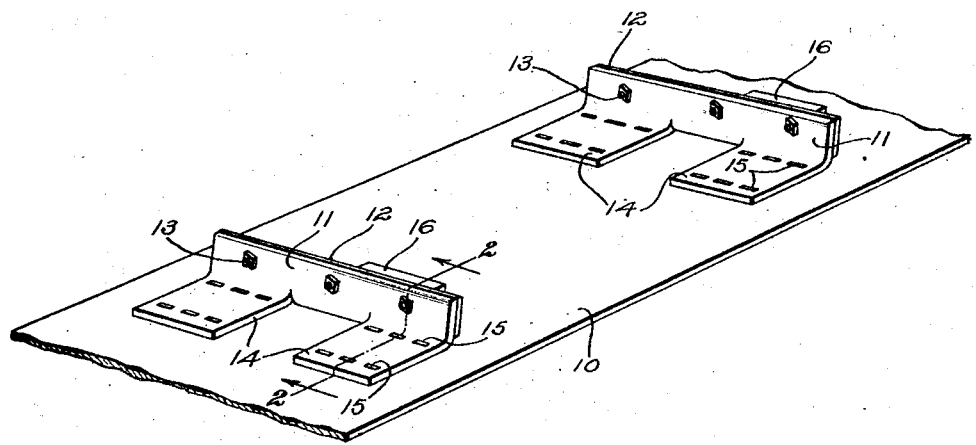
Figure 1 is a perspective view of a section of a conveyer belt equipped with my improved cleats.
Figure 2:
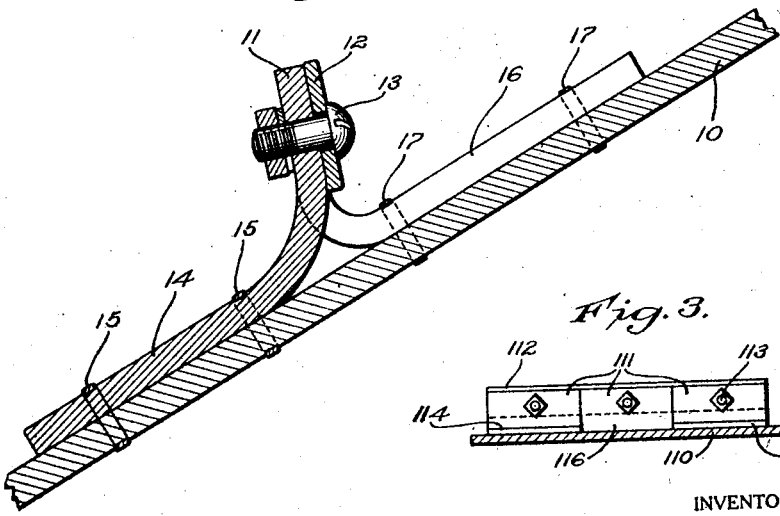
Figure 2 is an enlarged detail in vertical section at one of the cleats as indicated by the line 2—2 of Figure 1.

In carrying out my invention in accordance with the illustrated example, I employ a strip of rubber belting or similar fabric usually four-ply in practice and approximately one-quarter of an inch in thickness cutting the same about three inches in width and of a length suited to the width of the belt across which the strip is to be fastened.

In producing my invention in its preferred form, I slit the strip referred to transverse to its length so that the slits will run approximately vertical when the strip is positioned in the form of a cleat on the belt. The slitting produces members of equal widths and the members into which the strip is divided may vary, there being three, five, seven, or more according to the desired size of the members or the width of the belt. Referring still to the preferred form of the invention, the slits terminate about one inch short of one edge of the strip so that there will be a zone continuous with the several members and joining the same. In the illustrated example, the strip is indicated by the numeral 10 and the transverse cleats formed from said strips are indicated by the numeral 11. To each cleat I apply a stiffening metallic strip 12 extending across the cleat and projecting slightly above the upper edge of the rubber material of the cleat. The cleats 12 are secured by bolts 13 or equivalent fastening means to the rubber material.

The slitting of the cleat produces flaps, certain of which are designated 14 and the intermediate or alternating flap is designated 16. The flaps are bent to be disposed downwardly along the load surface of the belt 10 or upwardly. I have shown two of the flaps 14 extending downwardly on the belt and a third intermediate flap 16 disposed upwardly along the belt surface. The flaps 14 are fastened in any suitable manner advantageously in practice by clinched clips 15. Similarly, flap 16 is shown as fastened by clinched clips 17.

The locations of the respective fastening clips 15, 17 are such that those clips (17) are closer to the upwardly extending portion or cleat proper than the clips 15 securing the downwardly disposed flaps 14. The effect of thus disposing the respective clips 15, 17 is that the cleat when in position will incline slightly forward or upwardly of the belt, that is to say, forward of a position perpendicular to the plane of the belt, thereby making the cleat slightly forwardly overhanging instead of being rounded backward as in the case of the arched cleat or perpendicular to the belt as in the case of angle iron cleats bolted to the belt. The forward inclination or overhanging increases the efficiency of the cleat for the carrying up of the larger lumps of material, such as coal, or heavy gravel or broken stone.

Figure 3:
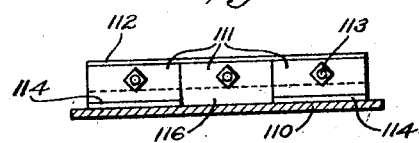
Figure 3 is an elevation of my improved cleat with the belt in section, the cleat in Figure 3 being of slightly different form from that shown in Figures 1 and 2.

A continuous strip is employed to form the cleat 11 and slitting the same to form the flaps 14, 16, but I may form the cleat of separate sections 111 consisting of strips of rubber or rubberized canvas laid side by side across the belt as shown in Figure 3. The sections 111 are bent to produce the flaps 114 corresponding with the flaps 14 and an intermediate flap 116 corresponding with the flap 16. The same means as described may secure the flaps 114, 116, and bolt 110. The use of the separate strips constituting a sectional cleat has the economical advantage that the cleat may be thus formed of the material of waste belting, but, on the other hand, there may be needed more fasteners to secure the cleat sections in position as well as to secure the strengthening and wear plate 112 corresponding with the plate 12.

I would state furthermore that while the illustrated examples constitute practical embodiments of my invention, I do not limit myself strictly to the exact details herein illustrated, since, manifestly, the same can be considerably varied without departure from the spirit of the invention as defined in the appended claims.

Having thus described my invention, I claim:

1. A conveyer belt having cleats thereon, said cleats including flexible material extending transversely of the belt and rising at a pronounced angle to the load surface of the belt, as well as flaps on said material extending at the lower edge thereof along the surface of the belt alternately forwardly and rearwardly and fastened to said belt.

2. A conveyer belt having cleats thereon composed of flexible material, and a stiffening plate disposed on said material at the forward face of the cleat, said plate rising above the upper edge of the flexible material.

CYRUS A. BRYANT.